United States Patent
Wang et al.

(10) Patent No.: US 8,408,662 B2
(45) Date of Patent: Apr. 2, 2013

(54) ELECTRONIC DEVICE ENCLOSURE

(75) Inventors: Liang-Chin Wang, Tu-Cheng (TW);
Jian Hu, Shenzhen (CN); Yu-Ming Xiao, Shenzhen (CN); Zan Li, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 33 days.

(21) Appl. No.: 13/163,755

(22) Filed: Jun. 20, 2011

(65) Prior Publication Data
US 2012/0091868 A1 Apr. 19, 2012

(30) Foreign Application Priority Data
Oct. 15, 2010 (CN) .......................... 2010 1 0509997

(51) Int. Cl.
*A47B 81/00* (2006.01)
*H01R 13/66* (2006.01)
(52) U.S. Cl. ..................... 312/223.2; 439/567
(58) Field of Classification Search ............... 312/223.2, 312/223.1, 257.1, 265.5, 265.6; 248/220.21, 248/224.8, 225.21; 439/549, 552–553, 557, 439/562, 567; 174/58; 361/679.4, 679.43
See application file for complete search history.

(56) References Cited

U.S. PATENT DOCUMENTS

| | | | | |
|---|---|---|---|---|
| 3,689,868 A * | 9/1972 | Snyder | .......................... | 439/501 |
| 5,191,544 A * | 3/1993 | Benck et al. | .................. | 361/688 |
| 5,690,403 A * | 11/1997 | Ellison et al. | .............. | 312/223.6 |
| 5,934,775 A * | 8/1999 | Ho | .............. | 312/223.2 |
| 6,123,579 A * | 9/2000 | Ping | .............. | 439/557 |
| 6,165,014 A * | 12/2000 | Kao et al. | .................. | 439/607.01 |
| 6,307,756 B1 * | 10/2001 | Liu et al. | ........................ | 361/816 |
| 6,846,200 B1 * | 1/2005 | Hsu | .............. | 439/540.1 |
| 7,018,237 B2 * | 3/2006 | Zhan et al. | ............... | 439/607.55 |
| 7,137,847 B2 * | 11/2006 | Trout et al. | .................... | 439/465 |
| 7,303,434 B1 * | 12/2007 | Chen et al. | .................... | 439/557 |
| 7,341,480 B2 * | 3/2008 | Byrne | ........................ | 439/532 |
| 7,344,407 B1 * | 3/2008 | Chen et al. | .................. | 439/540.1 |
| 7,789,701 B2 * | 9/2010 | Murr et al. | .................... | 439/552 |
| 2007/0035915 A1 * | 2/2007 | Chen et al. | .................... | 361/679 |
| 2009/0311909 A1 * | 12/2009 | Yu et al. | ................... | 439/607.23 |
| 2011/0012484 A1 * | 1/2011 | Chen et al. | ................. | 312/223.2 |
| 2011/0026222 A1 * | 2/2011 | Sun | .......................... | 361/679.58 |
| 2011/0143590 A1 * | 6/2011 | Peng et al. | .............. | 439/607.23 |
| 2011/0310554 A1 * | 12/2011 | Hiyama | .................. | 361/679.58 |
| 2012/0056052 A1 * | 3/2012 | Lu | .............. | 248/224.8 |
| 2012/0104910 A1 * | 5/2012 | Xu et al. | .................... | 312/223.1 |
| 2012/0129397 A1 * | 5/2012 | Chen | ....................... | 439/607.24 |
| 2012/0184153 A1 * | 7/2012 | Zhou et al. | .................... | 439/660 |

* cited by examiner

*Primary Examiner* — David Dunn
*Assistant Examiner* — Ryan A Doyle
(74) *Attorney, Agent, or Firm* — Altis Law Group, Inc.

(57) ABSTRACT

An electronic device enclosure comprises a securing plate and a bracket adapted to receive an I/O connector therein. The bracket comprises a first resilient piece, a second resilient piece, a first retaining piece and a second retaining piece. The bracket is capable of securing to the front wall in a first position, where the first resilient piece and the first retaining piece abut two opposite surfaces of the securing plate, and a second position, where the second resilient piece and the second retaining piece abut the two opposite surfaces of the securing plate.

20 Claims, 6 Drawing Sheets

ELECTRONIC DEVICE ENCLOSURE

REARGROUND

1. Technical Field

The present disclosure relates to an electronic device enclosure.

2. Description of Related Art

A front Input/Output (I/O) connector is always installed in a front plate of a computer, such as a universal serial bus (USB) connector and audio jack connector, for easy access by the users. Usually, the front I/O is secured to a securing plate of an electronic enclosure. However, the front I/O can only be secured to the securing plate at a fixed position and this may be inconvenient for the user. Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
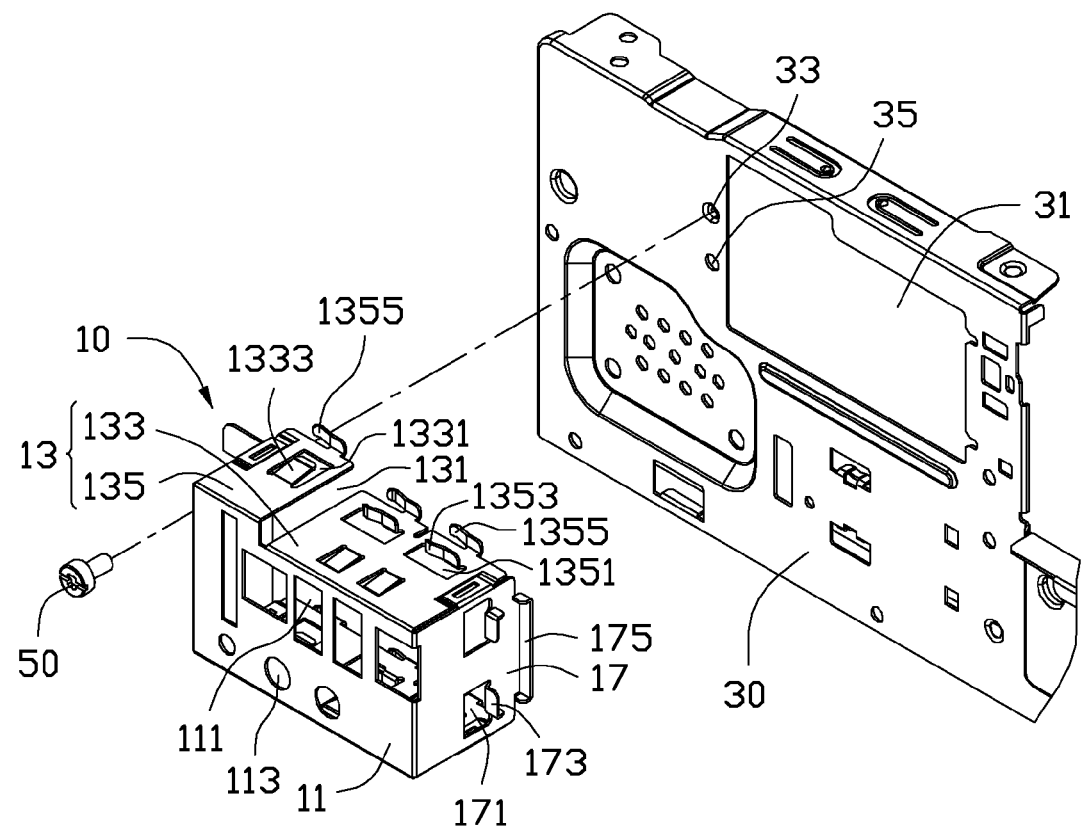
FIG. 1 is an exploded, isometric view of an electronic device enclosure in accordance with one embodiment.

Referring to FIG. 1, according to an embodiment, a computer enclosure includes a bracket 10 and a securing plate 30. The bracket 10 includes an I/O connector (not shown). In one embodiment, the I/O connector is a Front I/O connector.

Figure 2:
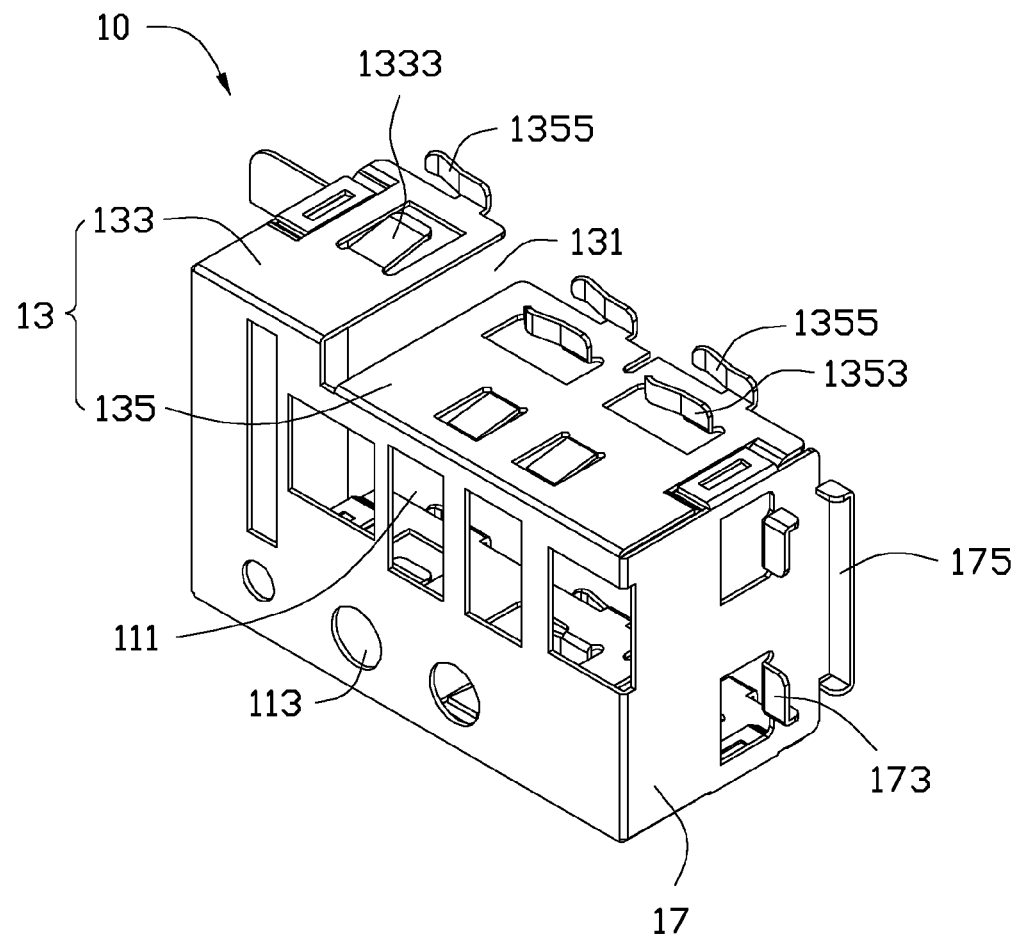
FIG. 2 is an isometric view of a bracket of FIG. 1.
Figure 3:
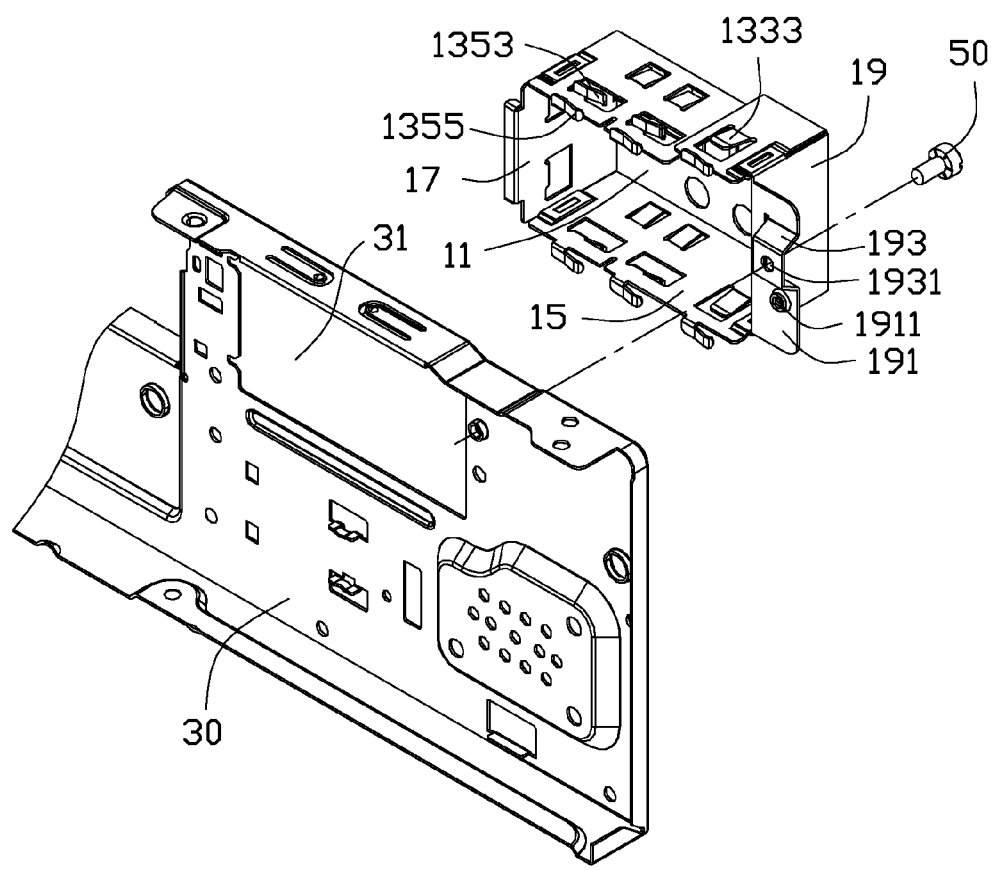
FIG. 3 is similar to FIG. 1, but viewed from another angle.

Referring also to FIGS. 2-3, the bracket 10 includes a front wall 11, a top wall 13, a bottom wall 15, a first sidewall 17 and a second sidewall 19. In one embodiment, the top wall 13, the bottom wall 15, the first sidewall 17 and the second sidewall 19 are substantially perpendicular to the front wall 11. The first sidewall 17 is substantially parallel to the second sidewall 19. The top wall 13 and the bottom wall 15 are substantially perpendicular to the first sidewall 17. The front wall 11, the top wall 13, the bottom wall 15, the first sidewall 17, and the second sidewall 19 communicate to define a receiving space. The receiving space is adapted to receive the Input/output connector.

The front wall 11 defines a plurality of openings 111 and a plurality of holes 113. Each of the plurality of openings 111 is adapted to position a USB connector, and each of the plurality of holes 113 is adapted to position an audio jack connector. The front wall 13 is divided into a first top wall 133 and a second top wall 135 by a notch 131. The first top wall 133 is substantially parallel to the second top wall 135. A pressing piece 1333 extends obliquely from the first top wall 133. Two first resilient pieces 1353 extend from the second top wall 135 and are substantially located on the same plane. A plurality of second resilient pieces 1355 extends from a free edge of the first top wall 133 and the second top wall 135. The plurality of second resilient pieces 1355 is similar to the first resilient pieces 1353 and substantially located on the same plane. In one embodiment, the first resilient pieces 1353 and the plurality of second resilient pieces 1355 are substantially perpendicular to the top wall 13, the first resilient pieces 1353 are substantially parallel to the plurality of second resilient pieces 1355. Two first retaining pieces 173 extend from the first sidewall 17, and a second retaining piece 175 extends from a free edge of the first sidewall 17. In one embodiment, the first retaining pieces 173 and the second retaining piece 175 are substantially perpendicular to the first sidewall 17, the first retaining pieces 173 are substantially parallel to the second retaining piece 175. A mounting piece 191 extends from a free edge of the second sidewall 19, and a bulge 193 extends from the mounting piece 191. The mounting piece 191 defines a first positioning hole 1911 and the bulge 193 defines a second positioning hole 1931. The first retaining pieces 173 define a first plane. The second retaining piece 175 defines a second plane. The first resilient pieces 1353 and the second resilient pieces 1355 are located between the first plane and the second plane. A distance between the mounting piece 191 and the plane of the base of the bulge 193 along a direction substantially perpendicular to the securing plate 30 is substantially equal to that between the first resilient pieces 1353 and the second resilient pieces 1355.

The securing plate 30 defines an installation opening 31, a first mounting hole 33 and a second mounting hole 35. The first mounting hole 33 and the second mounting hole 35 are located in a side edge of the installation opening 31. In one embodiment, the securing plate 30 is a front plate of a case.

Figure 4:
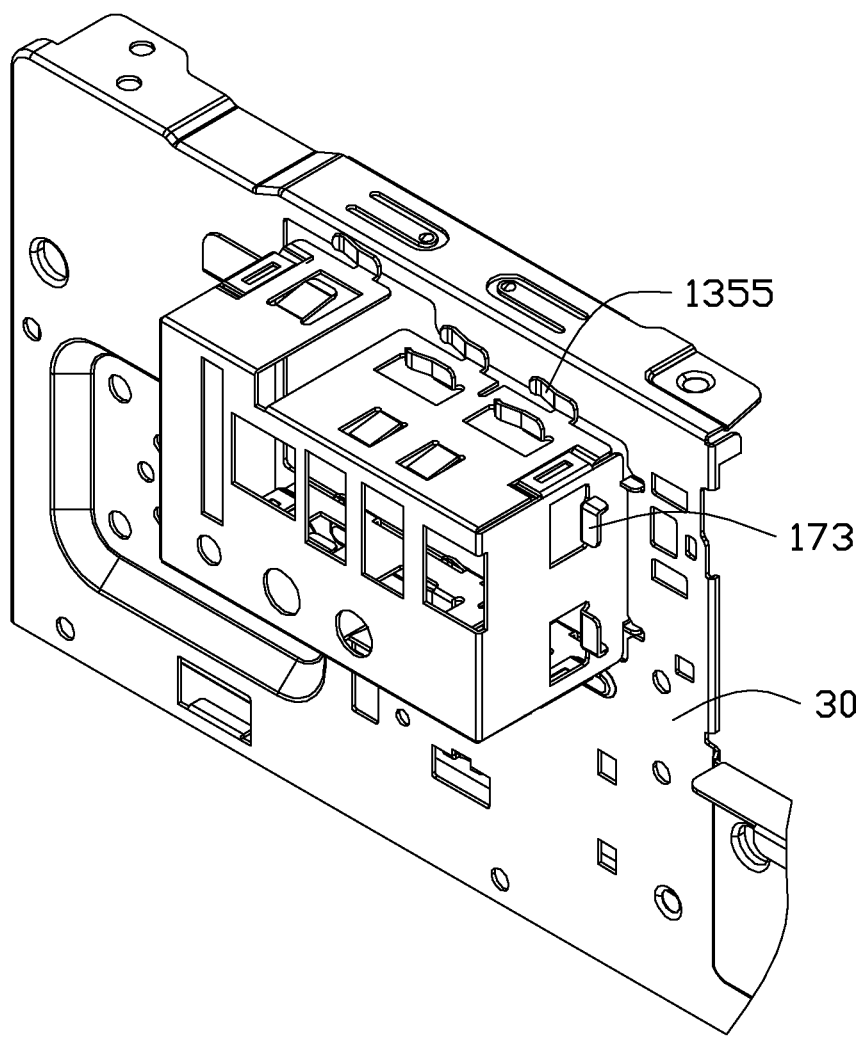
FIG. 4 is an assembled, isometric view of FIG. 1, and the bracket is located in a first position.
Figure 5:
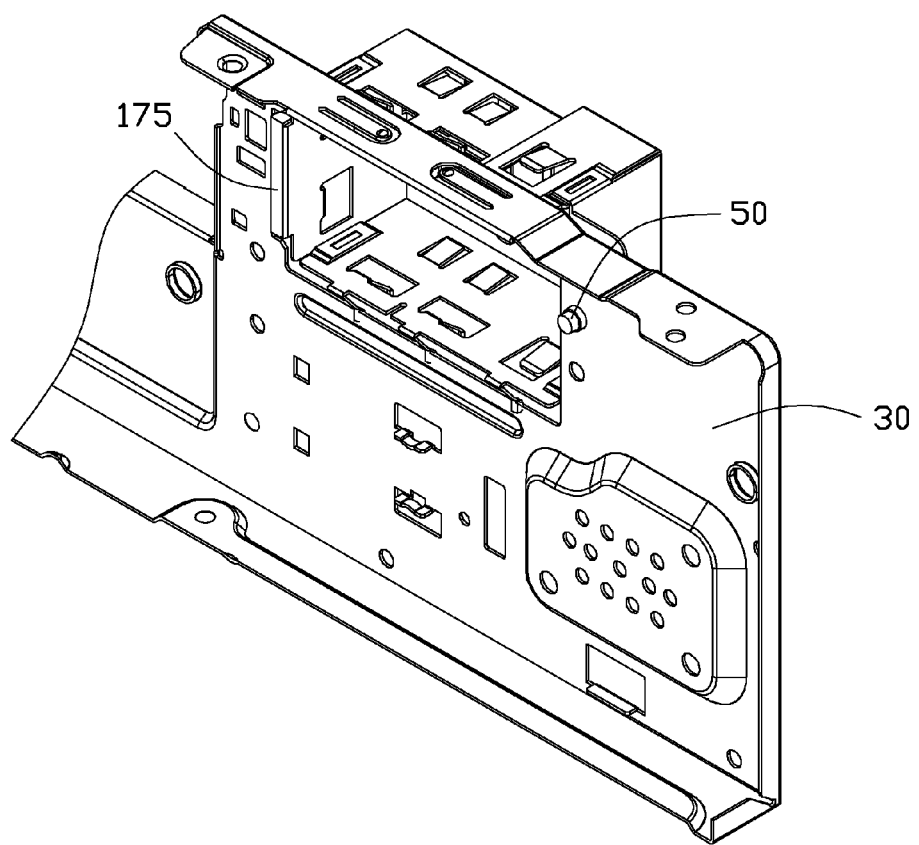
FIG. 5 is similar to FIG. 4, but viewed from another angle.
Figure 6:
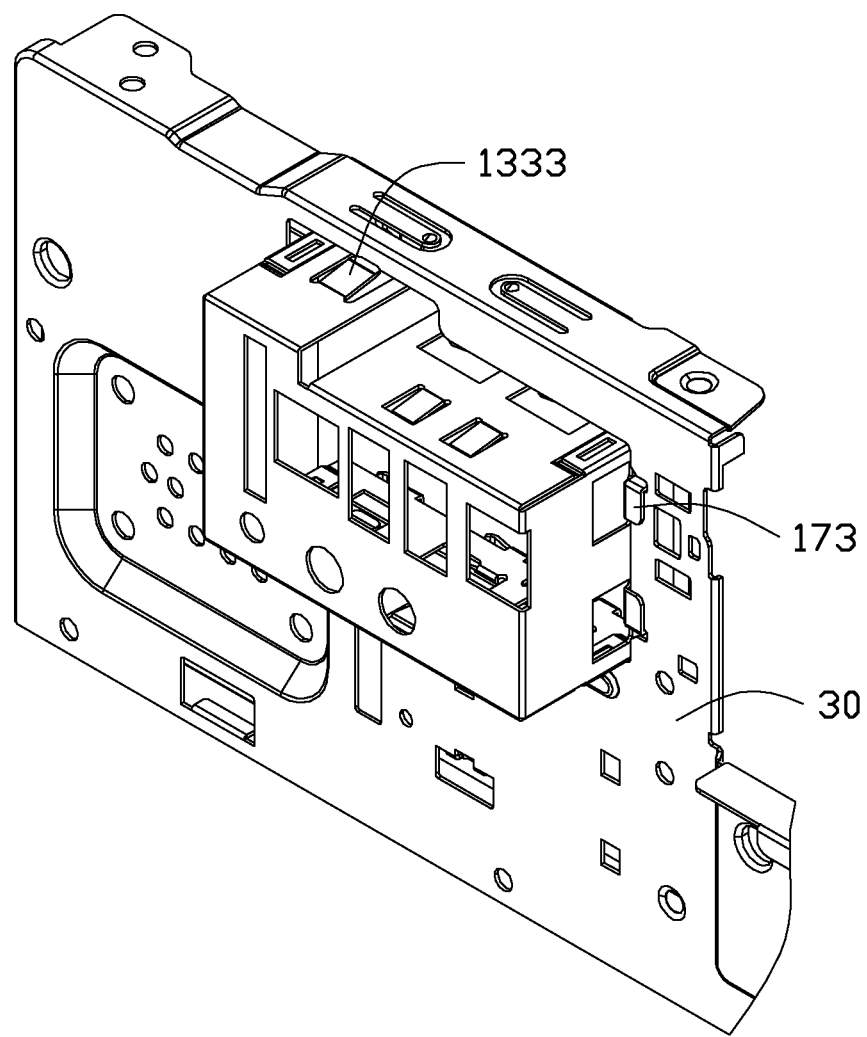
FIG. 6 is similar to FIG. 4, but the bracket is located in a second location.

Referring to FIG. 4-6, the bracket 10 may be secured to the front wall 30 in a first position or a second position.

In assembly, to mount the bracket 10 to the securing plate 30 in the first position, the bracket 10 is positioned obliquely, the second retaining piece 175 abuts an inner surface of the securing plate 30 from an outer surface of the securing plate 30 through the installation opening 31. The second resilient pieces 1355 abut the outer surface of the securing plate 30. The bracket 10 moves toward the securing plate 30, until the front wall 11 is substantially parallel to the securing plate 30. The bulge 193 abuts the outer surface of the securing plate 30, and the second positioning hole 1931 is aligned with the first mounting hole 33. The securing plate 30 resiliently deforms the second resilient pieces 1355. A locking member 50, such as a screw, is inserted into the second positioning hole 1931 and the first mounting hole 33. The second resilient pieces 1355 rebound to press the outer surface of the securing plate 30. The second retaining piece 175 abuts the inner surface of the securing plate 30. The bracket 10 is thereby secured to the securing plate 30.

In assembly, the bracket 10 is mounted to the securing plate 30 in the second position, the bracket 10 is positioned obliquely, the first retaining piece 173 abuts a outer surface of the securing plate 30 from a inner surface of the securing plate 30 through the installation opening 31. The first resilient pieces 1353 abut the inner surface of the securing plate 30. The bracket 10 is moved towards the securing plate 30, the securing plate 30 resiliently deforms the pressing piece 1333 and the first resilient pieces 1353. Until the front wall 11 is substantially parallel to the securing plate 30. The pressing piece 1333 is inserted out of the installation opening 31 and presses the outer surface of the securing plate 30. The mounting piece 191 abuts the inner surface of the securing plate 30, and the first positioning hole 1911 is aligned with the second mounting hole 35. The locking member 50 is inserted into the first positioning hole 1911 and the second mounting hole 35. The first resilient pieces 1353 rebound to press the inner surface of the securing plate 30. The first retaining piece 173 rebounds to abut the outer surface of the securing plate 30. The bracket 10 is thereby secured to the securing plate 30.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An electronic device enclosure comprising:
   a securing plate comprising an inner surface and an outer surface opposite to the inner surface; and
   a bracket, adapted to receive an I/O connector therein, the bracket comprising a front wall, a first resilient piece, a second resilient piece, a first retaining piece and a second retaining piece; each of the first resilient piece, the second resilient piece, the first retaining piece, and the second retaining piece is substantially parallel to the front wall; a distance between the first resilient piece and the front wall is greater than a distance between the second resilient piece and the front wall; and a distance between the first retaining piece and the front wall is greater than a distance between the second retaining piece and the front wall;
   wherein the bracket is operable to be secured selectively at a first position by the second resilient piece and the second retaining piece along a first direction from the outer surface to the inner surface, or at a second position by the first resilient piece and the first retaining piece along a second direction from the inner surface to the outer surface; when the bracket is in the first position, the second resilient piece abuts the outer surface of the securing plate, and the second retaining piece abuts the inner surface of the securing plate; when the bracket is in the second position, the first resilient piece abuts the inner surface of the securing plate, and the first retaining piece abuts the outer surface of the securing plate; the first retaining piece defines a first plane, and the second retaining piece defines a second plane substantially parallel to the first plane; and the first resilient piece and the second resilient piece are located between the first plane and the second plane and substantially parallel to the first plane and the second plane.

2. The electronic device enclosure of claim 1, wherein the first resilient piece is substantially parallel to the second resilient piece.

3. The electronic device enclosure of claim 1, wherein the bracket comprises a top wall, a bottom wall opposite to the top wall, a first sidewall, and a second sidewall connected to the top wall and the bottom wall; the first resilient piece and the second resilient piece extend from the top wall and the bottom wall.

4. The electronic device enclosure of claim 3, wherein each of the first sidewall and the second sidewall is substantially perpendicular to the top wall and the bottom wall; the first retaining piece and the second retaining piece extend from the first sidewall.

5. The electronic device enclosure of claim 3, wherein a pressing piece extends from each of the top wall and the bottom wall, and the bottom wall abuts the securing plate.

6. The electronic device enclosure of claim 3, wherein a mounting piece extends from the second sidewall, a bulge extends from the mounting piece; a distance between the mounting piece and plane of the base of the bulge along a direction substantially perpendicular to the securing plate is substantially equal to that between the first resilient piece and the second resilient piece.

7. The electronic device enclosure of claim 6, wherein the mounting piece defines a first positioning hole, the securing plate defines a first mounting hole, and the first positioning hole is aligned with the first mounting hole when the bracket is in the first position.

8. The electronic device enclosure of claim 6, wherein the bulge defines a second positioning hole, the securing plate further defines a second mounting hole, and the second positioning hole is aligned with the second mounting hole when the bracket is in the second position.

9. The electronic device enclosure of claim 6, wherein when the bracket is in the first position, the mounting piece and the bulge are located on the outer surface, and the bulge abuts the outer surface; and when the bracket is in the second position, the mounting piece and the bulge are located on the inner surface, and the mounting piece abuts the inner surface.

10. The electronic device enclosure of claim 1, wherein when the bracket is in the first position, a distance between the second resilient piece and the securing plate is smaller than a distance between the first resilient piece and the securing plate; and when the bracket is in the second position, a distance between the second resilient piece and the securing plate is greater than a distance between the first resilient piece and the securing plate.

11. An electronic device enclosure comprising:
    a securing plate comprising an inner surface and an outer surface opposite to the inner surface;
    a bracket, adapted to receiving an I/O connector therein, comprising a first resilient piece, a second resilient piece, a first retaining piece, a second retaining piece, a mounting piece, and a bulge extending from the mounting piece;
    wherein the bracket is operable to be secured selectively at a first position by the second resilient piece and the second retaining piece along a first direction from the outer surface to the inner surface, or at a second position by the first resilient piece and the first retaining piece along a second direction from the inner surface to the outer surface; when the bracket is in the first position, the second resilient piece abuts the outer surface of the securing plate, the second retaining piece abuts the inner surface of the securing plate, the mounting piece and the bulge are located on the outer surface, and the bulge abuts the outer surface; when the bracket is in the second position, the first resilient piece abuts the inner surface of the securing plate, the first retaining piece abuts the outer surface of the securing plate, the mounting piece and the bulge are located on the inner surface, and the mounting piece abuts the inner surface.

12. The electronic device enclosure of claim 11, wherein the first retaining piece defines a first plane, the second retaining piece defines a second plane; the first resilient piece and the second resilient pieces are located between the first plane and the second plane and substantially parallel to the first plane and the second plane.

13. The electronic device enclosure of claim 11, wherein the first resilient piece is substantially parallel to the second resilient piece.

14. The electronic device enclosure of claim 11, wherein the bracket comprises a top wall, a bottom wall opposite to the top wall, a first sidewall, and a second sidewall connected to the top wall and the bottom wall; the first resilient piece and the second resilient piece extend from the top wall and the bottom wall.

15. The electronic device enclosure of claim 14, wherein each of the first sidewall and the second sidewall is substantially perpendicular to the top wall and the bottom wall; the first retaining piece and the second retaining piece extend from the first sidewall.

16. The electronic device enclosure of claim 14, wherein a pressing piece extends from each of the top wall and the bottom wall, and the bottom wall abuts the securing plate.

17. The electronic device enclosure of claim 14, wherein the mounting piece extends from the second sidewall; and a distance between the mounting piece and plane of the base of the bulge along a direction substantially perpendicular to the securing plate is substantially equal to that between the first resilient piece and the second resilient piece.

18. The electronic device enclosure of claim 17, wherein the mounting piece defines a first positioning hole, the securing plate defines a first mounting hole, and the first positioning hole is aligned with the first mounting hole when the bracket is in the first position.

19. The electronic device enclosure of claim 17, wherein the bulge defines a second positioning hole, the securing plate further defines a second mounting hole, and the second positioning hole is aligned with the second mounting hole when the bracket is in the second position.

20. The electronic device enclosure of claim 11, wherein when the bracket is in the first position, a distance between the second resilient piece and the securing plate is smaller than a distance between the first resilient piece and the securing plate; and when the bracket is in the second position, a distance between the second resilient piece and the securing plate is greater than a distance between the first resilient piece and the securing plate.

* * * * *